US012809833B2

(12) United States Patent
Kostakis et al.

(10) Patent No.: US 12,809,833 B2
(45) **Date of Patent: *Nov. 24, 2026**

(54) SIMILARITY-BASED LISTING RECOMMENDATIONS IN A DATA EXCHANGE

(71) Applicant: Snowflake Inc., Bozeman, MT (US)

(72) Inventors: Orestis Kostakis, Redmond, WA (US); Prasanna V. Krishnan, Palo Alto, CA (US); Subramanian Muralidhar Muralidhar, Mercer Island, WA (US); Shakhina Pulatova, San Francisco, CA (US); Megan Marie Schoendorf, San Francisco, CA (US)

(73) Assignee: SNOWFLAKE INC., Menlos Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,750

(22) Filed: Aug. 21, 2024

(65) Prior Publication Data

US 2024/0411738 A1 Dec. 12, 2024

Related U.S. Application Data

(63) Continuation of application No. 18/112,934, filed on Feb. 22, 2023, now Pat. No. 12,093,229, which is a (Continued)

(51) Int. Cl.

*G06F 16/00* (2019.01)
*G06F 16/176* (2019.01)

(Continued)

(52) U.S. Cl.

CPC .......... *G06F 16/215* (2019.01); *G06F 16/176* (2019.01); *G06F 16/24578* (2019.01); *G06F 16/256* (2019.01)

(58) Field of Classification Search

None

See application file for complete search history.

(56) References Cited

U.S. PATENT DOCUMENTS 10,885,565 B1 1/2021 Russell et al.
11,494,686 B1 * 11/2022 Mandayam Comar ...................... G06N 20/00

(Continued)

OTHER PUBLICATIONS

"U.S. Appl. No. 17/872,463, Examiner Interview Summary mailed Jan. 4, 2023", 2 pgs.

(Continued)

*Primary Examiner* — Bai D Vu

(74) *Attorney, Agent, or Firm* — SCHWEGMAN LUNDBERG & WOESSNER, P.A.

(57) ABSTRACT

A set of affinity characteristics may be determined for a set of listings, a listing comprising data to be shared through a data exchange, wherein the set of affinity characteristics comprises at least one of: operations performed against a listing; account details and characteristics specific to the listing; static characteristics; or dynamic characteristics. For each pair of listings of the set of listings, an affinity score can be calculated using the set of affinity characteristics, the affinity score indicating a similarity between the pair of listings. One or more listings of the set of listings based on the affinity score between the first listing and the similar listing can be presented.

25 Claims, 6 Drawing Sheets

Related U.S. Application Data continuation of application No. 17/872,463, filed on Jul. 25, 2022, now Pat. No. 11,687,506.

(60) Provisional application No. 63/351,685, filed on Jun. 13, 2022.

(51) Int. Cl.

*G06F 16/215* (2019.01)
*G06F 16/2457* (2019.01)
*G06F 16/25* (2019.01)

(56) References Cited

U.S. PATENT DOCUMENTS

| | | | | |
|---|---|---|---|---|
| 2007/0273909 | A1 | 11/2007 | Chen et al. | |
| 2011/0314031 | A1 * | 12/2011 | Chittar ................ | G06F 16/5854 707/E17.019 |
| 2014/0229494 | A1 | 8/2014 | Wu | |
| 2015/0095185 | A1 | 4/2015 | Katukuri et al. | |
| 2018/0091390 | A1 | 3/2018 | Yang et al. | |
| 2018/0218430 | A1 * | 8/2018 | Prendki .............. | G06Q 30/0641 |
| 2022/0270119 | A1 * | 8/2022 | Sullivan ............. | G06Q 30/0202 |

OTHER PUBLICATIONS

"U.S. Appl. No. 17/872,463, Non Final Office Action mailed Dec. 8, 2022", 9 pgs.
"U.S. Appl. No. 17/872,463, Notice of Allowance mailed Feb. 8, 2023", 9 pgs.
"U.S. Appl. No. 17/872,463, Response filed Jan. 20, 2023 to Non Final Office Action mailed Dec. 8, 2022", 13 pgs.
"U.S. Appl. No. 17/872,463, Supplemental Amendment filed Jan. 23, 2023", 9 pgs.
"U.S. Appl. No. 18/112,934, Examiner Interview Summary mailed Jun. 18, 2024", 3 pgs.
"U.S. Appl. No. 18/112,934, Non Final Office Action mailed Mar. 27, 2024", 30 pgs.
"U.S. Appl. No. 18/112,934, Notice of Allowance mailed Aug. 7, 2024", 12 pgs.
"U.S. Appl. No. 18/112,934, Response filed Jun. 24, 2024 to Non Final Office Action mailed Mar. 27, 2024", 14 pgs.

* cited by examiner

SIMILARITY-BASED LISTING RECOMMENDATIONS IN A DATA EXCHANGE

CROSS REFERENCE TO RELATED APPLICATIONS

This application is a continuation of U.S. patent application Ser. No. 18/112,934, filed on Feb. 22, 2023, which is a continuation of U.S. application Ser. No. 17/872,463, filed Jul. 25, 2022, now U.S. Pat. No. 11,687,506, issued Jun. 27, 2023, entitled "Similarity-Based Listing Recommendations in a Data Exchange," which claims the benefit of U.S. Provisional Application No. 63/351,685 filed on Jun. 13, 2022, entitled "Similarity-Based Listing Recommendations in a Data Exchange," and these applications are hereby incorporated by reference herein in their entirety.

TECHNICAL FIELD

The present disclosure relates to data sharing platforms, and particularly to providing similarity-based listing recommendations for a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
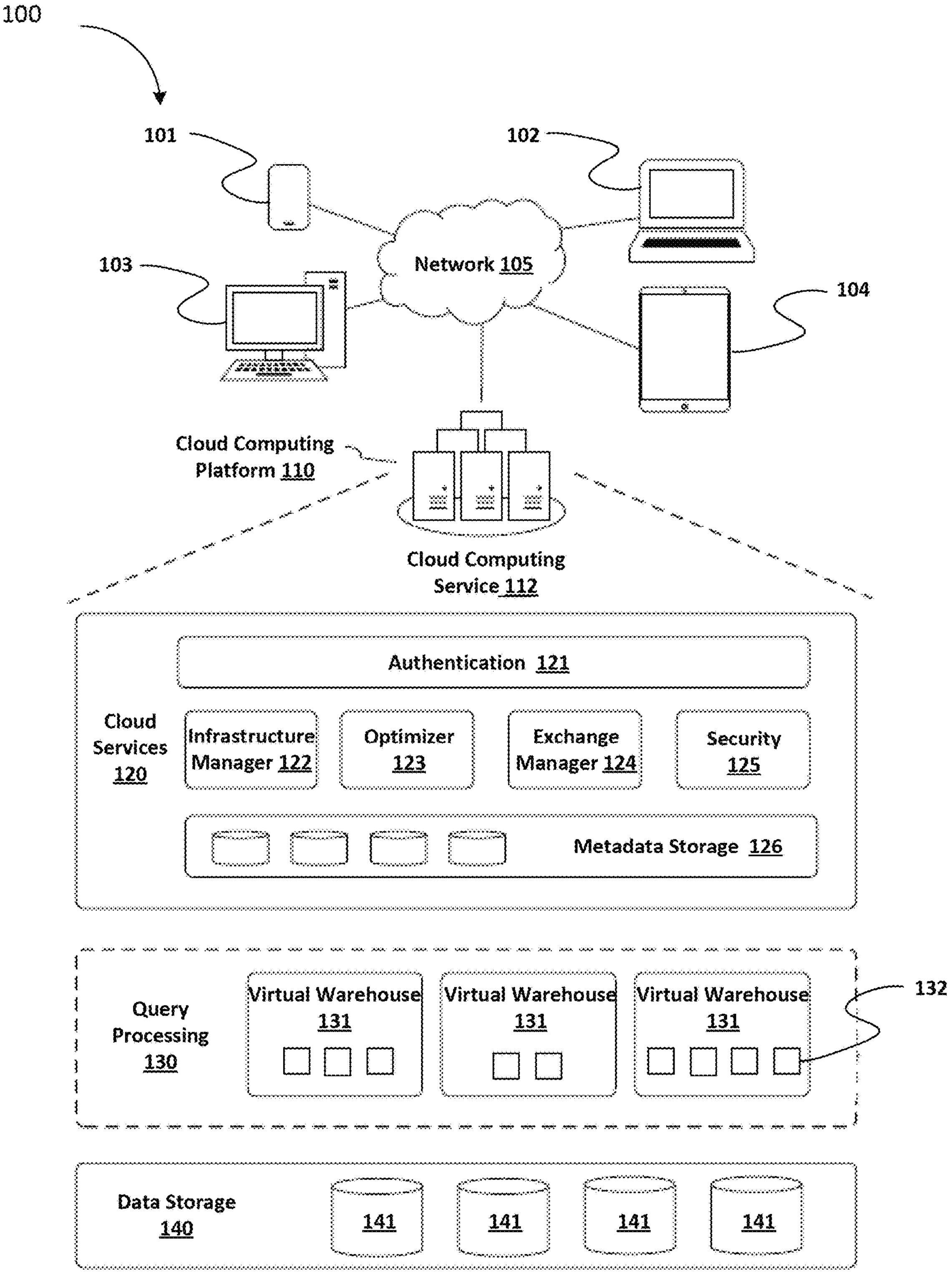
FIG. 1A is a block diagram depicting an example computing environment in which the methods disclosed herein may be implemented, in accordance with some embodiments of the present invention.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This can have several disadvantages. First, it can be slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, nimbler cloud-focused startups can be priced out of accessing this data, even though the data may be valuable to their businesses. This may be because raw data assets can be too unpolished and full of potentially sensitive data to simply outright sell/provide to other companies. Data cleaning, de-identification, aggregation, joining, and other forms of data enrichment may need to be performed by the owner of data before it is shareable with another party. This can be time-consuming and expensive. Finally, it can be difficult to share data assets with large numbers of entities because, for the reasons mentioned above, traditional data sharing methods do not allow scalable sharing. Traditional sharing methods can also introduce latency and delays in terms of all parties having access to the most recently updated data.

Private and public data exchanges may allow data providers to share their data assets more easily and securely with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or available to consumers, partners, suppliers, or others. The data provider may control what data assets are exposed as well as control who has access to which sets of data. This can allow a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may share data without copying it between companies. Data providers may invite other entities to view their data listings, control which data listings appear in their private online marketplace, and control who can access data listings and how others can interact with the data assets connected to the listings. This may be thought of as a "walled garden" marketplace, in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a Data Supplier or Data Provider. For example, a new clothing brand may wish to access data sets related to consumer clothing purchases and online shopping habits. Company A may support a page on its website that is or functions substantially similarly to a data exchange, where a data consumer, e.g., the new clothing brand, may browse, explore, discover, access and potentially purchase data sets directly from Company A. Further, Company A may control who can enter the data exchange, the entities that may view a particular listing, the actions that an entity may take with respect to a listing, e.g., view only, and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data, but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

Searching, by users, for relevant listings in a data marketplace, e.g., Snowflake's Data Marketplace, can be a challenge. Such a search can be facilitated by providing a list (set) of listings related to a current or past search, as well as, e.g., listing recommendations for other listings that might be of interest to a user. In some cases, the contents of a listing may include native applications, that have been shared by a data provider, rather than a dataset.

One approach for selecting listings to recommend involves collaborative filtering (CF) to determine those listings that are complementary to listings a user has previously interacted with. An example of CF is determining "users who performed 'x-action' on this listing also performed 'x-action' on these listings," where "x-action" might be "viewed," "bought," "downloaded," "listened-to," etc. Another example of CF could be "these listings are popular among users like you."

An alternative approach to CF, suitable for recommending listings in a data marketplace, distinguishes the operations ("x actions") performed against, e.g., a listing, from account details and characteristics that are specific to the listing. Such an approach can suggest listings that provide "replaceability" as opposed to data listings that are "complementary." For example, a complementary search, as can be obtained from CF, might recommend light bulbs to someone who has purchased a floor lamp. By contrast, a "replaceability," or "similarity" search might suggest other types of lamps, e.g., reading lamps, desk lamps, lanterns, flashlights, etc.

In some cases, users may not be fully satisfied with CF-style "complementary" recommendations. Thus, it can be desirable to emphasize "replaceability," or alternatives that are similar in nature to what they have, but different in some aspects, e.g., cost, characteristics, etc., in order to allow the user to fine-tune their selection.

The present disclosure provides techniques for determining affinity of a set of listings for a first listing within a data exchange. In some embodiments, for a listing, one or more affinity scores can be determined with one or more other listings. In some cases, distance scores can be determined that show the dissimilarity between listings. In some cases, these scores can be derived from SQL metadata stored in database tables and columns and from database and external functions. In some embodiments, recommendations of similar listings can be based on popularity, relevance, or on personalized recommendations based on user preferences and/or activity. In some embodiments, upon determination of a set of listings, that set, or list, can be presented to a consumer.

FIG. 1A is a block diagram of an example computing environment 100 in which the systems and methods disclosed herein may be implemented. In particular, a cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as Amazon S3™ to store data and query results on the cloud computing platform 110. In particular embodiments, to load data into the cloud computing platform 110, data tables may be horizontally partitioned into large, immutable files that may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, generation of affinity information that takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
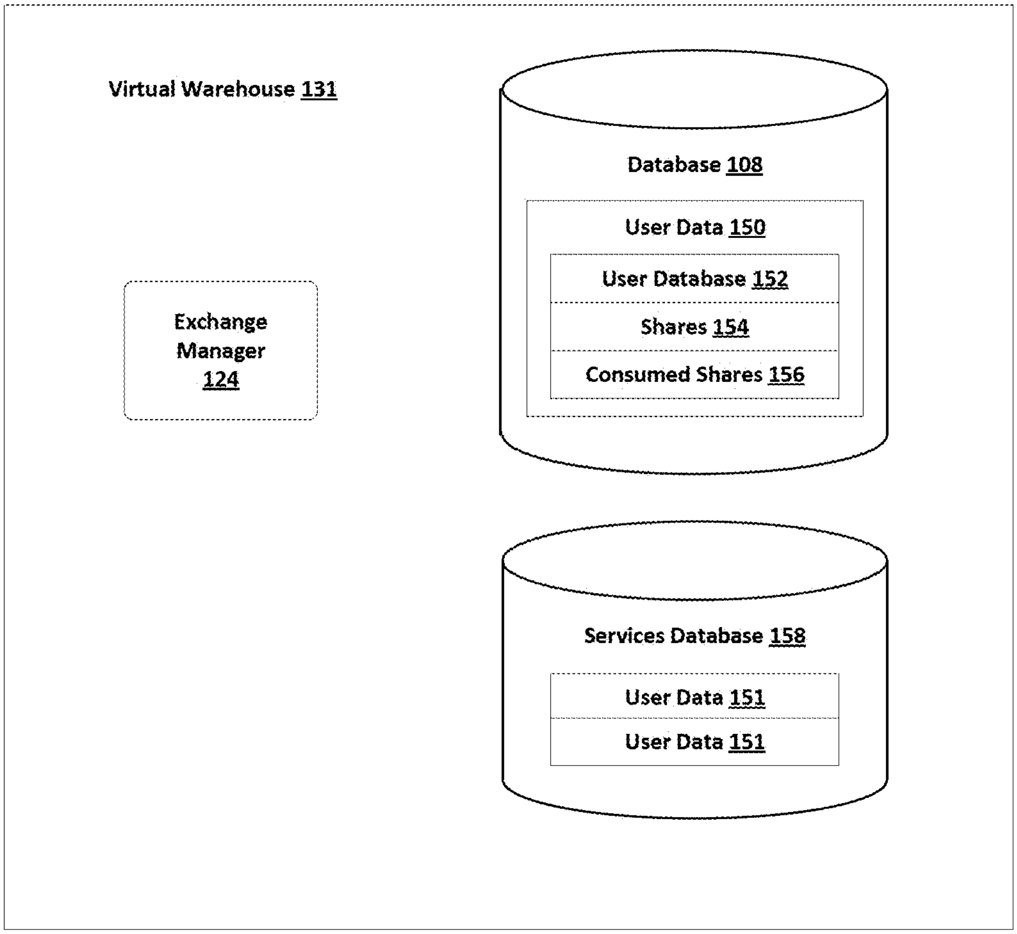
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g., different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data while the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
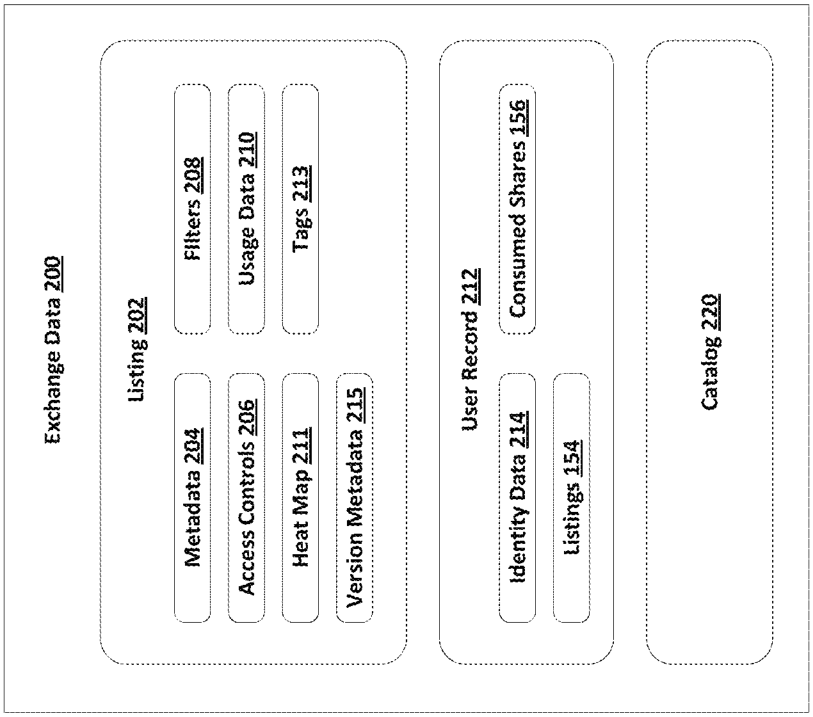
FIG. 2 is a schematic block diagram of data that may be used to implement a public or private data exchange, in accordance with some embodiments of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share in which users may request access but are only allowed access upon approval of the provider. The access controls 206 may specify a set of user identifiers of users that are excluded from being able to access the data referenced by the listing 202.

Figure 4:
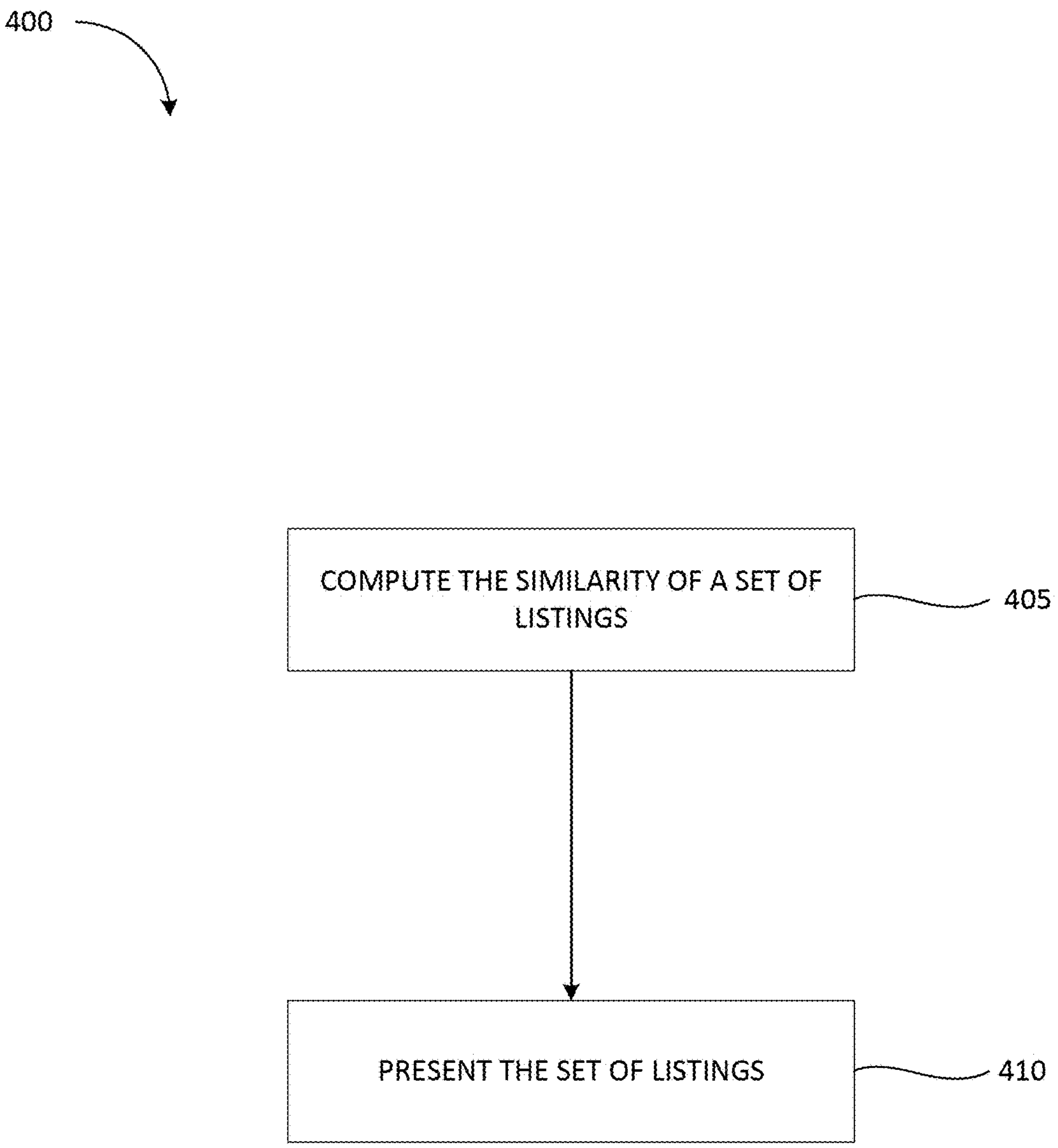
FIG. 4 is a flow diagram of an example deployment of a data exchange that illustrates techniques for determining the similarity of listings, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 (also referred to herein as user identifiers) of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e., adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e., a reference to a database including the usage data is added by the exchange manager 124 to the consumed shares 156 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the listings have changed over time. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g., an identifier (e.g., warehouse identifier) of a user having user data 151 in service database 158 and managed by the virtual warehouse 131.

The user record 212 may list shares associated with the user, e.g., reference listings 154 created by the user. The user record 212 may list shares consumed by the user, e.g., reference listings 202 created by another user and that have been associated to the account of the user according to the methods described herein. For example, a listing 202 may have an identifier that will be used to reference it in the shares or consumed shares 156 of a user record 212.

The listing 202 may also include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer) such as supply chain optimization. A use case may be specific to a particular industry, or can apply to multiple industries. Any given data listing can help solve one or more use cases, and hence may be applicable to multiple use cases.

Because use case information relates to how data is used, it can be a powerful tool for organizing/searching for data listings as it allows consumers of the data marketplace to explore and find listings and services based on industry problems they're trying to solve (e.g., supply chain optimization, audience segmentation). However, while users can often find complementary listings, they can find it difficult to find listings that suggest "replaceability" as opposed to "complementary." For example, a complementary search might recommend light bulbs to someone who has purchased a floor lamp. By contrast, a "replaceability," or "similarity" search might suggest different kinds of lamps, e.g., reading lamps, desk lamps, lanterns, flashlights, etc.

Embodiments of the present disclosure solve the above and other problems by enabling providers to assign "similarity" or "affinity" scores to pairs of listings allowing identification of a set of listings having characteristics most like a particular listing. The embodiments described herein make it easy for consumers to browse the data exchange based on their business needs in order to find listings that solve those needs. Embodiments of the present disclosure also enable a data exchange to better serve their consumers' business needs based on their browsing patterns, querying activities (individual and collective), and the intrinsic content of listings, and further personalize their overall data exchange experience.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as the Bing™ search engine or the Google search engine. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3:
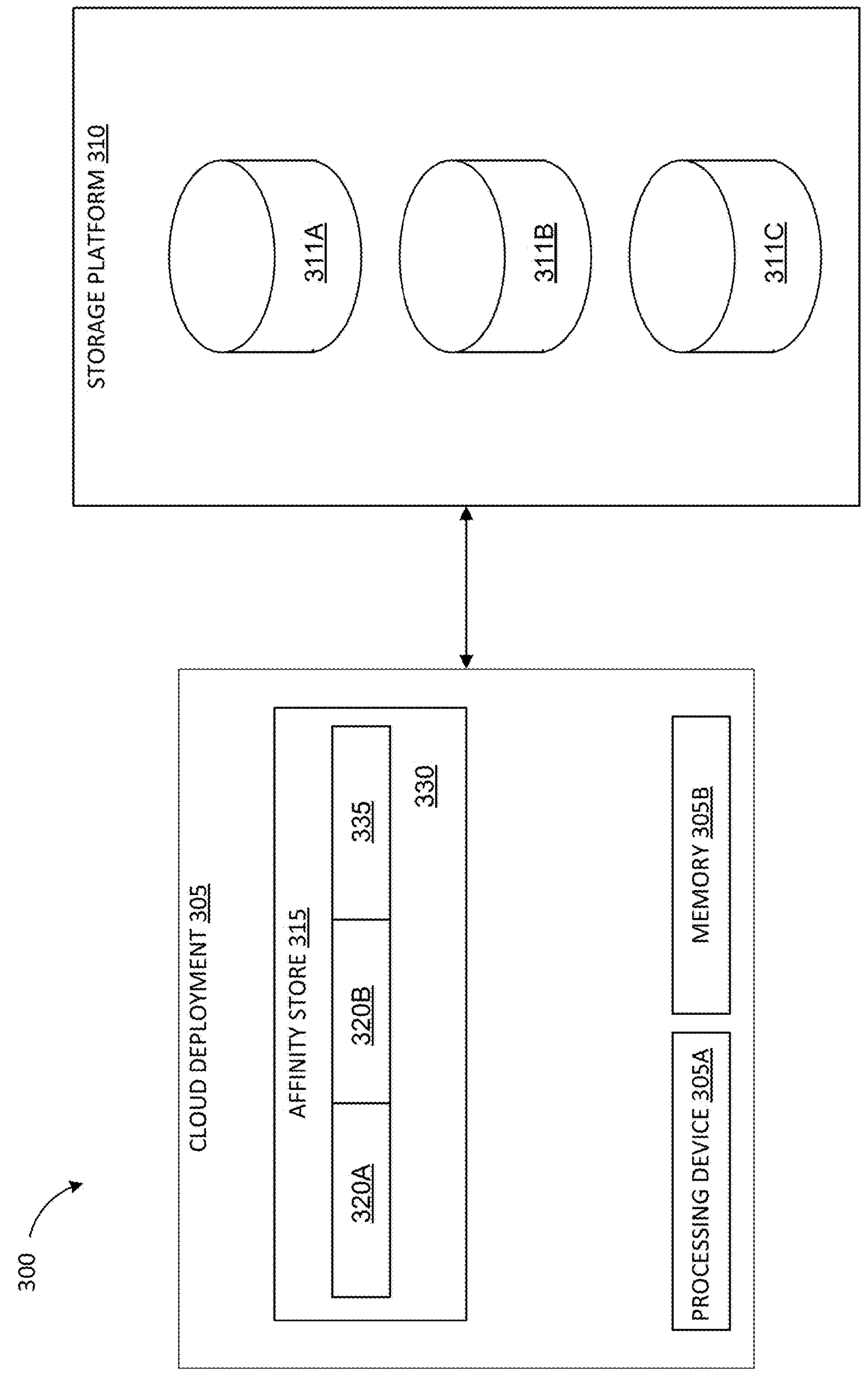
FIG. 3 is a schematic block diagram of an example deployment of a data exchange, in accordance with some embodiments of the present disclosure.

FIG. 3 illustrates a cloud environment 300 that includes a storage platform 310 (similar to the cloud computing platform 110 illustrated in FIG. 1A) and a cloud deployment 305. The cloud deployment 305 may comprise a similar architecture to cloud computing service 112 (illustrated in FIG. 1A) and may be a deployment of a data exchange or data marketplace. Although illustrated with a single cloud deployment, the cloud environment 300 may have multiple cloud deployments that may be physically located in separate remote geographical regions, but may all be deployments of a single data exchange or data marketplace. Although embodiments of the present disclosure are described with respect to a data exchange, this is for example purpose only and the embodiments of the present disclosure may be implemented in any appropriate enterprise database system or data sharing platform where data may be shared among users of the system/platform.

The cloud deployment 305 may include hardware such as processing device 305A (e.g., processors, central processing units (CPUs), memory 305B (e.g., random access memory (RAM), storage devices (e.g., hard-disk drive (HDD), solid-state drive (SSD), etc.), and other hardware devices (e.g., sound card, video card, etc.). A storage device may comprise persistent storage capable of storing data. Persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The cloud deployment 305 may comprise any suitable type of computing device or machine that has a programmable processor including, for example, server computers, desktop computers, laptop computers, tablet computers, smartphones, set-top boxes, etc. In some examples, the cloud deployment 305 may comprise a single machine or may include multiple interconnected machines (e.g., multiple servers configured in a cluster).

Databases and schemas may be used to organize data stored in the cloud deployment 305 and each database may belong to a single account within the cloud deployment 305. Each database may be thought of as a container having a classic folder hierarchy within it. Each database may be a logical grouping of schemas and a schema may be a logical grouping of database objects, e.g., tables, views, etc. Each schema may belong to a single database. Together, a database and a schema may comprise a namespace. When performing any operations on objects within a database, the namespace can be inferred from the current database and the schema that is in use for the session. If a database and schema are not in use for the session, the namespace may need to be explicitly specified when performing any operations on the objects.

The storage platform 310 may facilitate the storing of data and may comprise any appropriate object storage service such as e.g., the Amazon S3™ service to store data and query results. The storage platform 310 may comprise multiple buckets (databases) 311A-311C.

FIG. 3 also illustrates an example listing similarity determination process in which the affinity between listings can be determined and made available to cloud deployment 305.

Identifying "similar listings" to a user can involve two steps. First, similarity factors can be identified and determined for pairs of listings. Second, an "affinity" score can be recorded for the pair of listings. In some cases, an affinity score can be sometimes referred to as a similarity score. Then, for a particular listing, other listings having a high affinity, or similarity, to that listing can be presented to the user.

In some embodiments, the cloud deployment 305 may contain an affinity store 315. Affinity store 315 may be a table containing similarity tuples 330. In an example, a similarity tuple 330, or similarity record, may contain listings, e.g., 320A and 320B, and attributes 335 that describe a measure of similarity between the listings 320A and 320B. In some embodiments, these attributes 335 may include similarity information that describes the similarity or affinity between the listings 320A and 320B. In some cases, a similarity tuple 330 may include a pair of listings, 320A and 320B, as shown. In some cases, a similarity tuple 330 may include any number of listings. In some embodiments, a similarity record may reference a set of listings. In some cases, within the similarity tuple 330, listings 320A and 320B may be examples of listing 202, as illustrated in FIG. 2.

In some cases, an affinity score can be determined for each pair of listings. In some embodiments, this affinity score may be stored as an attribute 335. There are a number of ways that affinity scores can be calculated, with varying degrees of quality and performance. In some embodiments, a distance score can be determined, showing the dissimilarity of a pair of listings. In some cases, listing metadata (predetermined static values that describe the listing, e.g., listing name, description text, and relevant industry vertical) can be used. In some cases, information from the actual dataset content can be used. In some cases, this information can include information derived from SQL metadata and information about the actual values, e.g., data distributions, numbers of distinct values, etc. In some cases, the information derived from SQL metadata can include the names of database tables and the number and name of the columns in those database tables. In some cases, the information derived from SQL metadata can include knowledge gained from machine learning classifiers. Examples of such information can include the semantic type of each column (a column can be named "Location," be of type "string" or "integer," and have a semantic type of "Zip Code." For such a column, an embodiment could score the similarity of a pair of listings based on their zip codes. For example, a user may be interested in listings for a similar geographic area. In some embodiments, the results of these similarity functions may be recorded in the attributes 335.

In some cases, affinity scores could be based on the number of views that a listing received, by the number of installations of a listing, by the number of times that native applications within listings are executed, or other measures of usage. In some embodiments, multiple affinity scores may be stored as attributes 335.

Listing metadata can include a structured field "category," which can be used to determine the similarity of listings. In some cases, natural language processing (NLP) can extract features from the description-text of a listing. These features can refer to the content of the listing and to the quality of the listing. In some embodiments, this information can be recorded in attributes 335.

In some cases, attributes 335 may include timestamps as to when the affinity calculation was performed, the criteria by which the affinity was determined, an expiration time for the record 330, and a metric indicating the number of times the record was used. In some embodiments, time stamps may be included for purposes of time decay operations. In some cases, attributes may be incorporated to support weighting of similarity records 330. In some cases, attributes may be incorporated to support tiered formulas, such that listings by Company A that possess high affinity with certain other listings are not adversely affected by the publication of new listings by Company A, which, due to their novelty, have low affinity scores.

In some cases, determining an affinity score for pairs of listings can be performed offline, in advance of use. In other cases, the affinity score can be obtained on-the-fly. For an on-the-fly identification of similar listings, for a given listing, it can be compared to all other listings and those most similar identified. In some cases, dissimilarity, if distance functions are being used rather than similarity functions, can be used to identify the least dissimilar listings.

In some embodiments, a decision to pre-compute and store, for each listing, its most similar counterpart listings, may depend on several factors, including system limitations and usage patterns. In some cases, these same factors may indicate on-the-fly determination of most similar listings.

After a set of similar listings has been identified, the set can be presented to a user. The presentation of most-similar listings can be deterministic/strict, such that the order of similar listings is strictly based on the affinity scores. In some cases, the presentation can contain randomization, e.g., mix the order and/or select N listings among the N+M most similar. In some embodiments, randomizations can be inserted as a means to avoid situations such as promoting the top "most similar" and demoting the "runners-up."

In addition to suggesting listings that are relevant, or similar, to other listings, consumers can also be provided with a means of obtaining recommendations for listings that reflect their personalized criteria and the popularity of the listings.

In some cases, criteria for providing personalized recommendations can include information from the consumer's account, e.g., industry, company, role/job title, role/privileges within the data exchange. In some embodiments, personalized recommendations can be influenced by the consumer's exchange activity, e.g., previous searches and browsing activity, and previous listing views, installs, or jobs. In some cases, personalized recommendations can be influenced by a consumer's existing data, e.g., data in the exchange or queries. In some cases, personalized recommendations may be influenced by listing quality, e.g., listing completeness, provider reputation, etc.

Listing recommendations may be made based on (or additionally based on) popularity of listings. In an embodiment, popularity can be viewed as a vector measure rather than a single value, and may be based on listing views, installs/uninstalls for trials and purchases, and jobs (native applications) run. In other words, a popularity metric may have multiple components. In an embodiment, popularity may be decomposed into sub-values for the number of times a listing has been viewed, the number of times a listing has been installed or retrieved (get request), and the number of times a job (native application) has been executed. In some cases, popularity may be based on the surface area on web pages. Popularity may also be determined by computing weighted popularity scores for each listing, then filtering by combinations of categories, business needs, and providers.

Given the determination of the popularity of a listing, the popularity of the providers of those listings can also be established. In some cases, considering a provider's listings, scoring functions such as average popularity score, average percentile, average over each provider's top-k, weighted averages based on quartile/global-top-k (e.g., 1.0 weight if in top quartile, 0.5 if in second, etc.), or combinations of the above may be used. In some embodiments, PageRank or Hubs and Authorities-like approaches may be used. PageRank works by counting the number and quality of links to a webpage to determine a rough estimate of how important the webpage is. An underlying assumption is that more important web pages are likely to receive more links from other web pages. A PageRank algorithm scores the popularity of a webpage A as the sum of the popularity scores of pages having outgoing links to webpage A divided by the number of outgoing links of each page. By comparison, a Hubs and Authorities algorithm (also known as a hyperlink-induced topic search, or HITS algorithm) assigns two scores for each web page, its authority, which estimates the value of the content of the page, and its hub value, which estimates the values of its links to other web pages.

In some embodiments, taking an average can have adverse effects for high-quality providers with a small number of listings. In some cases, should a provider with a single most-popular listing add a second listing, their average would drop in half. In some cases, simply summing popularity scores could encourage providers to prioritize quantity over quality. In some embodiments, a tiered approach to determining popularity can be used in which a tiered-sum approach is employed and each provider's score can be a weighted sum of the popularity scores of their listings.

Furthermore, in some embodiments, these different components can be weighted. In some cases, a number of times a job has been run can be weighted higher than installs, which in turn can be weighted higher than views.

In some cases, the popularity of a listing can be affected by time-decay. In some embodiments, time-decay allows a listing with 10 views that are five-years-old to be represented as less popular than a listing with 2 views today. In some embodiments, time-decay can be accomplished using a variety of functions, e.g., sliding window functions, hyperbolic functions, exponential functions, and linear decay functions.

In some cases, presentation of "similar" recommendations can be achieved through a user interface (UI). "Similar"

recommendations can be presented as such, or combined with buttons (links) that enable direct interaction (purchase, installation, etc.) without requiring a user to visit a dedicated webpage. In some embodiments, presentation can be performed through an exposed programmatic interface.

In the case of listings including one or more functions, similarity (or dissimilarity) of pairs of functions can be determined after inspecting and comparing various characteristics of the functions. These characteristics may be either static or dynamic.

Static characteristics can include the number and types of input arguments of the functions and the types of return values, a histogram of the commands in a function, the length of the functions in terms of lines-of-code or machine-code once compiled, and the structural similarity of the control flow graphs. Control flow graphs can be graph representation of executable functions. For example, lines that are always executed consecutively are part of the same code-block, but if-(else)-statements, for/while-loops, go-to statements, return (function exits) and other such programming primitives may cause multiple possible paths of execution, or possible edges to other code-blocks.

Dynamic characteristics can include the execution time or computer memory that functions require when applied on the same/similar data-inputs, the distribution of produced values as applied to a series of different data-inputs, or the actual code-commands executed when same/similar values are input as parameters.

If listings contain multiple functions, different schemas can be employed to determine similarity or dissimilarity with other listings that also contain one or more functions. These schemas can include retaining the most or least similar, taking the average over all pairs, or a sum of similarity when each function is matched to the closest. Other approaches can also be applied. In some cases, the choice of approach can affect the final similarity rankings.

The calculated similarity information may be stored in the databases 311A-311C in storage platform 310 or in some other location. In some cases, the calculated similarity information may not be stored, but may rather be generated dynamically, upon user demand.

FIG. 4 is a flow diagram of a method 400 for determining the affinity or similarity of a set of listings, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by processing device 305A of cloud deployment 305, as illustrated in FIG. 3.

At 405, the processing device 305A may calculate the affinity scores for and between the listings in the data exchange. In some cases, the calculation may be done offline and in a batch mode. In some cases, the calculations may be performed on-the-fly based on user activity. In some embodiments, the affinity scores can be stored as records in an affinity store 315, as shown in FIG. 3.

At 410, the processing device 305A may present a set of listings to a consumer. In some cases, this presentation may be interactively through a user interface (UI). In some cases, this presentation may be made programmatically.

In this way, in some embodiments, consumers can be provided with a means of obtaining recommendations for "similar" listings that reflect their personalized criteria, the popularity of the listings, and/or the relevance of the listings, based on attributes of the listings themselves.

Figure 5:
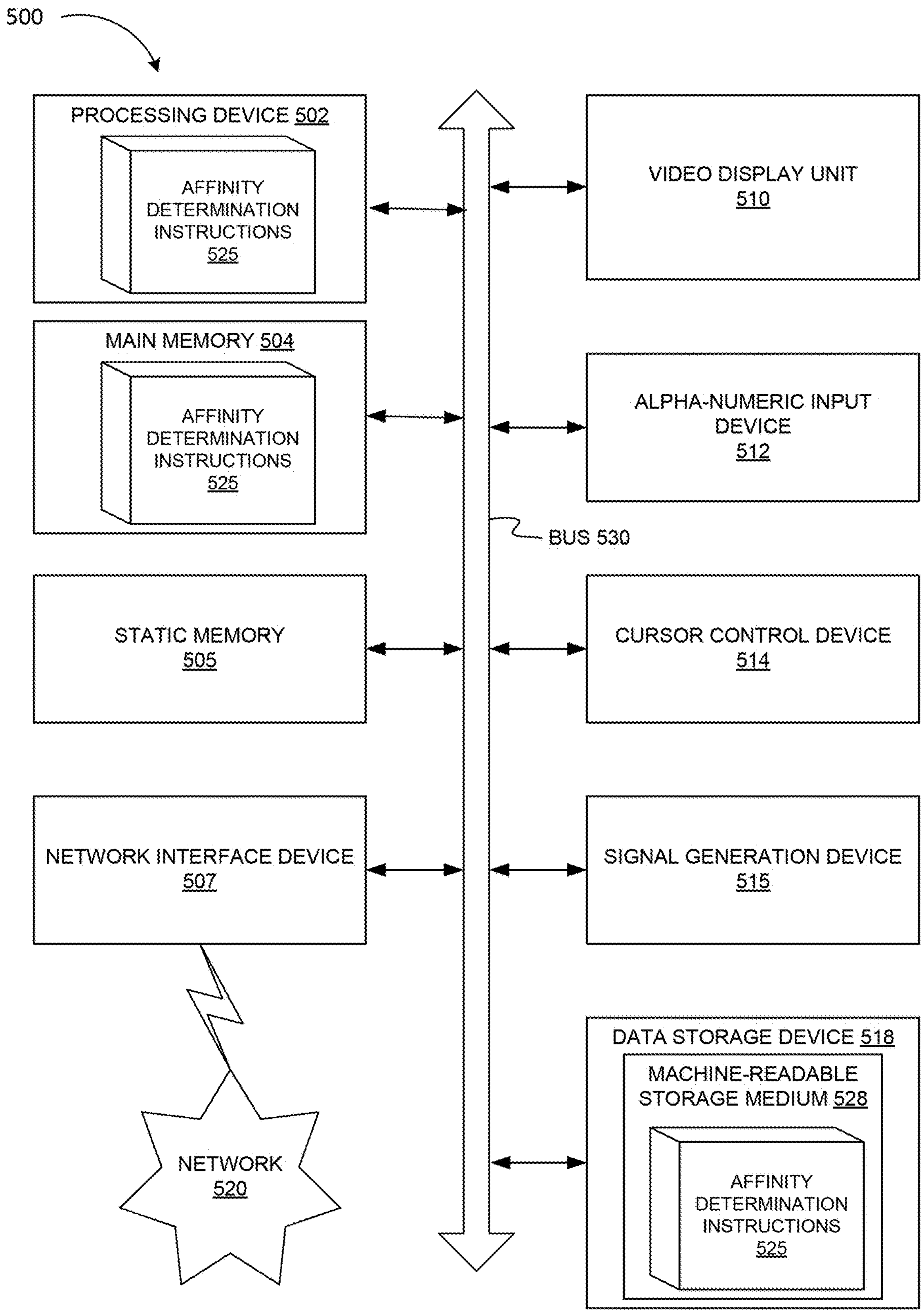
FIG. 5 is a block diagram of an example computing device that may perform one or more of the operations described herein, in accordance with some embodiments of the present invention.

FIG. 5 illustrates a diagrammatic representation of a machine in the example form of a computer system 500 within which a set of instructions may reside, for causing the machine to perform any one or more of the methodologies discussed herein for determining the affinity of listings within a data exchange.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random-access memory (DRAM), a static memory 505 (e.g., flash memory, static random-access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 507 that may communicate with a network 520. The computing device 500 also may include a video display unit 510 (e.g., a liquid crystal display (LCD) or a cathode ray tube (CRT)), an alpha-numeric input device 512 (e.g., a keyboard), a cursor control device 514 (e.g., a mouse) and an acoustic signal generation device 515 (e.g., a speaker). In one embodiment, video display unit 510, alphanumeric input device 512, and cursor control device 514, which may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device

502 is configured to execute affinity determination instructions 525, for performing the operations and steps discussed herein.

The data storage device 518 may include a machine-readable storage medium 528, on which is stored one or more sets of affinity determination instructions 525, e.g., software, embodying any one or more of the methodologies of functions described herein. The affinity determination instructions 525 may also reside, completely or at least partially, within the main memory 504 or within the processing device 502 during execution thereof by the computer system 500; the main memory 504 and the processing device 502 also constituting machine-readable storage media. The affinity determination instructions 525 may further be transmitted or received over a network 520 via the network interface device 507.

The machine-readable storage medium 528 may also be used to store instructions to perform the methods described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system that allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system comprising:

a memory; and a processing device, operatively coupled to the memory, the processing device to:

determine a set of affinity characteristics for a set of listings, a listing comprising data to be shared through a data exchange, wherein the set of affinity characteristics comprises at least one of:

operations performed against at least one listing from the set of listings;

account details and characteristics specific to the at least one listing;

static characteristics; or dynamic characteristics;

for each pair of listings of the set of listings, using the processing device, calculate an affinity score using the set of affinity characteristics, the affinity score indicating a similarity between the each pair of listings of the set of listings; and present, for a first listing from the set of listings, a set of similar listings from the set of listings based on the affinity score between the first listing and the set of listings, wherein presenting comprises using at least one of:

a user interface; or a programmatic interface.

2. The system of claim 1, wherein the set of affinity characteristics include a number of times at the least one listing of the set of listings has been referenced.

3. The system of claim 1, wherein an order of presentation of the at least one listing of the set of listings is strictly ordered by affinity scores.

4. The system of claim 1, wherein an order of presentation of the at least one listing of the set of listings is based at least in part on a randomization of a fixed number of listings.

5. The system of claim 1, wherein the set of affinity characteristics include SQL metadata from the set of listings.

6. The system of claim 1, wherein an input to the set of affinity characteristics includes a structured field from the set of listings.

7. The system of claim 1, wherein the set of affinity characteristics support a tiered formula, wherein affinity characteristics associated with the at least one listing of the set of listings associated with an organization are unaffected by a publication of new listings of the set of listings associated with the organization.

8. The system of claim 1, wherein the processing device is further to:

store a record in an affinity store, the record including:

a reference to a pair of listings; and the affinity score, wherein the record includes a plurality of affinity scores.

9. A method comprising:

determining a set of affinity characteristics for a set of listings, a listing comprising data to be shared through a data exchange, wherein the set of affinity characteristics comprises at least one of:

operations performed against at least one listing from the set of listings;

account details and characteristics specific to the at least one listing;

static characteristics; or dynamic characteristics;

for each pair of listings of the set of listings, calculating, by a processing device, an affinity score using the set of affinity characteristics, the affinity score indicating a similarity between the each pair of listings of the set of listings; and presenting, for a first listing from the set of listings, a set of similar listings from the set of listings based on the affinity score between the first listing and the set of listings, wherein presenting comprises using at least one of:

a user interface; or a programmatic interface.

10. The method of claim 9, further comprising:

storing a record in an affinity store, the record including:

a reference to a pair of listings;

the affinity score;

a calculation timestamp comprising a date and a time that the affinity score was calculated;

an expiration time for the record; and a number of times the record has been used.

11. The method of claim 10, wherein the affinity score is weighted at least in part on time decay of the calculation timestamp.

12. The method of claim 9, wherein the affinity score is based at least in part on usage of the at least one listing, the usage comprising at least one of:

a number of views that the at least one listing receives;

a number of installations of the at least one listing; or a number of executions of native applications within the at least one listing.

13. The method of claim 9, further comprising:

calculating a distance score indicating dissimilar characteristics for a pair of listings of the set of listings, using the set of affinity characteristics, for the each pair of listings of the set of listings; and storing, in a record in an affinity store, the distance score.

14. The method of claim 9, wherein the set of affinity characteristics include SQL metadata from the set of listings.

15. The method of claim 14, wherein the SQL metadata includes knowledge gained from machine learning classifiers.

16. The method of claim 9, wherein the affinity score is calculated in response to a request for a presentation of listings similar to the first listing of the set of listings.

17. The method of claim 9, wherein the affinity score is pre-computed prior to a request for listings similar to the first listing of the set of listings.

18. A non-transitory computer-readable medium storing instructions thereon which, when executed by a processing device, cause the processing device to:

determine a set of affinity characteristics for a set of listings, a listing comprising data to be shared through a data exchange, wherein the set of affinity characteristics comprises at least one of:

operations performed against at least one listing from the set of listings;

account details and characteristics specific to the at least one listing;

static characteristics; or dynamic characteristics;

for each pair of listings of the set of listings, calculate, by the processing device, an affinity score using the set of affinity characteristics, the affinity score indicating a similarity between the each pair of listings of the set of listings; and present, for a first listing from the set of listings, a set of similar listings from the set of listings based on the affinity score between the first listing and the set of listings, wherein presenting comprises using at least one of:

a user interface; or a programmatic interface.

19. The non-transitory computer-readable medium of claim 18, wherein the instructions, when executed by the processing device, further cause the processing device to:

use natural language processing to extract information, as an input to the set of affinity characteristics, from a description in the at least one listing of the set of listings.

20. The non-transitory computer-readable medium of claim 18, wherein the set of affinity characteristics include a number of times the at least one listing of the set of listings has been referenced.

21. The non-transitory computer-readable medium of claim 18, wherein the set of affinity characteristics include SQL metadata from the at least one listing of the set of listings.

22. The non-transitory computer-readable medium of claim 21, wherein the SQL metadata further includes static values that describe the at least one listing of the set of listings.

23. The non-transitory computer-readable medium of claim 21, wherein the SQL metadata further includes database table names and database column names.

24. The non-transitory computer-readable medium of claim 18, wherein the instructions, when executed by the processing device, further cause the processing device to:

store a record in an affinity store, the record comprising:

a reference to a pair of listings;

the affinity score;

a calculation timestamp comprising a date and a time that the affinity score was calculated;

an expiration time for the record; and a number of times the record has been used.

25. The non-transitory computer-readable medium of claim 24, wherein the affinity score is weighted based at least in part on time decay of the calculation timestamp.

* * * * *